US011007728B2

(12) United States Patent
Ke et al.

(10) Patent No.: US 11,007,728 B2
(45) Date of Patent: May 18, 2021

(54) FIBER PLACEMENT HEAD INTEGRATING TOW CONVERGING MECHANISM

(71) Applicant: ZHEJIANG UNIVERSITY, Zhejiang (CN)

(72) Inventors: Zhenzheng Ke, Zhejiang (CN); Liang Cheng, Zhejiang (CN); Weidong Zhu, Zhejiang (CN); Weiwei Qu, Zhejiang (CN); Junxia Jiang, Zhejiang (CN); Yinglin Ke, Zhejiang (CN); Jiangxiong Li, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 302 days.

(21) Appl. No.: 16/197,366

(22) Filed: Nov. 21, 2018

(65) Prior Publication Data
US 2019/0375169 A1    Dec. 12, 2019

(30) Foreign Application Priority Data

Jun. 11, 2018    (CN) .......................... 201810594230.3

(51) Int. Cl.
*B29C 70/56*    (2006.01)
*B29C 70/38*    (2006.01)

(52) U.S. Cl.
CPC ............ *B29C 70/384* (2013.01); *B29C 70/56* (2013.01)

(58) Field of Classification Search
CPC .............................. B29C 70/384; B29C 70/56
See application file for complete search history.

(56) References Cited

U.S. PATENT DOCUMENTS

| 4,869,774 A | * | 9/1989 | Wisbey | B29C 70/32 |
| | | | | 156/523 |
| 2014/0238612 A1 | * | 8/2014 | Vaniglia | B65H 59/04 |
| | | | | 156/510 |
| 2017/0101286 A1 | * | 4/2017 | Brockman | B65H 59/04 |

FOREIGN PATENT DOCUMENTS

CN                105415707            3/2016

* cited by examiner

*Primary Examiner* — Scott W Dodds
(74) *Attorney, Agent, or Firm* — JCIPRNET (57) ABSTRACT

This invention relates to a fiber placement head integrating tow converging mechanism, comprising: fiber placement head mounting base; fixed yarn box component and revolving yarn box component arranged at the side end of the fiber placement head mounting base, tow passage formed between the revolving mounting face of the said fiber placement head mounting base and the relative face of the revolving yarn box component; tow conveying components respectively arranged on the sides of the fixed yarn box component and revolving yarn box component; and tow converging mechanism for guiding and converging tows conveyed by tow conveying components. Through appropriate design of guide pulley and tow passage, the fiber placement head realizes the guiding and converging of multiple tows, avoiding intervening among the tows.

9 Claims, 6 Drawing Sheets

FIG. 6

FIBER PLACEMENT HEAD INTEGRATING TOW CONVERGING MECHANISM

CROSS-REFERENCE TO RELATED APPLICATION

This application claims the priority benefit of China patent application serial no. 201810594230.3, filed on Jun. 11, 2018. The entirety of the above-mentioned patent application is hereby incorporated by reference herein and made a part of the specification.

BACKGROUND OF THE INVENTION

Technical Field

The invention belongs to the automated placement technical field of composite material, and specifically relates to a fiber placement head integrating tow converging mechanism.

Related Art

Composite material is a heterogeneous material formed by combining two or more materials of different properties and formed through composite means. Attributable to its advantages of high specific strength, high specific modulus, fatigue resistant, good vibration dampening and good manufacturability etc., it has been widely applied in the aviation field etc., and has been gradually taking the place of conventional metals. Use of composite materials in Boeing 787 airplane and Airbus A350 airplane accounts for 50% or above.

Methods for preforming composite material member include manual placement, automated tape laying, winding forming and automated fiber placement. However, when it comes to airplane members of high curvature profiles, automated tape laying cannot satisfy the requirement, whereas automated fiber placement allows for precision control of single fiber cutting and restart, and the width of single fiber is far less than the width of the composite material tape, allowing for placement on complex members, members with highly variable curvatures or members with opening. Therefore, automated fiber placement has been widely applied.

Tow converging mechanism is one of the core components of automated fiber placement machine, it is used for guiding and converging tows, and is the key to realize precise control of tow tension and speed of fiber placement machine, and is also the precondition for realizing tow cutting and restart functions of fiber placement machine. For example, Chinese patent CN 105415707 A discloses a composite material placement equipment integrating placement head and creel, comprising placement head creel and flange connection component, wherein the placement head comprises hold-down mechanism, wedge-shaped piece, wedge-shaped piece connecting frame, two cutting mechanisms, two repeat conveying mechanisms, two clamping mechanisms and a plurality of quick release mechanism, and the creel comprises disc, tension regulating mechanism, film collecting mechanism and tow guide mechanism.

The tow converging mechanism directly affects the final placement quality of the automated placement machine, and has high requirement on the appropriate layout of guide pulley, appropriate design of tow passage and control of tow speed and tension control etc., and is one of the major difficulties in automated placement machine design.

SUMMARY OF THE INVENTION

In consideration of the shortcomings of the prior art, a fiber placement head integrating tow converging mechanism is provided, which, through appropriate design of guide pulley and tow passage, the guiding and converging of multiple tows is realized, and intervening among the tows is avoided.

The technical solution provided by this invention is as follows:

A fiber placement head integrating tow convergence mechanism, comprising:

Fiber placement head mounting base;

Fixed yarn box component and revolving yarn box component arranged at the side end of the fiber placement head mounting base, tow passage is formed between the revolving mounting face of the said fiber placement head mounting base and the relative face of the revolving yarn box component;

Tow conveying components arranged at each of the sides of the fixed yarn box components and the revolving yarn box component;

And tow converging mechanism for guiding and converging the tows conveyed by the tow conveying component;

The said tow converging mechanism comprises first tow converging unit arranged in the tow passage and second tow converging unit arranged at the lower part of the fiber placement head mounting base; the said first tow converging unit is for guiding and converging tows conveyed by the tow conveying component, and the said second tow converging unit is for guiding and converging tows converged by the first tow converging unit.

In the above-described technical solution, through appropriate design of tow converging mechanism and tow passage, the guiding and converging of multiple tows are realized, intervening among the tows are avoided.

A fixed mounting face for mounting fixed yarn box component and a revolving mounting face for mounting revolving yarn box component are respectively provided at the side ends of the said mounting base of the fiber placement head of this invention; the said fixed mounting face and the revolving mounting face are alternately arranged at the side ends of the mounting base of the fiber placement head. The number of the yarn box components can be added or expanded based on the specific requirement of the equipment, making the maximum number of tows of placement to 4N, where N is the number of the yarn box components.

A pair of upper yokes are arranged on the said revolving mounting face of this invention, and the said revolving shaft is arranged between the upper yokes; a damping support rod is provided between the said upper yokes and the revolving yarn box component. The damping support rod is primarily to provide acting force for the revolving yarn box component, or to control the movement of the revolving yarn box component in combination with other acting forces.

A pair of lower yokes are arranged on the said revolving mounting face of this invention, and a snap-joint mechanism is formed between the said lower yokes and the revolving yarn box component. The snap-joint mechanism is to realize the relative fixing of the revolving yarn box component and the mounting base of the fiber placement head, and the snap-joint mechanism can adopt the structure of that in the prior art, which can open when it is exerted with external force.

The said tow conveying component in this invention comprises: tow collecting-depositing mechanism, backing paper recycling mechanism, tension regulating mechanism and tension detection mechanism sequentially arranged in the tow conveying direction. The spindle is installed on the tow collecting-depositing mechanism, and the backing paper of the tow is recycled by the backing paper recycling mechanism, and the tow with backing paper removed goes through tension regulating mechanism and tension detection mechanism to be conveyed towards the tow converging mechanism. The tension regulating mechanism realizes stable and constant tension output for the tow, avoiding tow breakage in the course of conveying.

The said tow conveying component in this invention further comprises: laser rangefinder mechanism for detecting the thickness of tows left on the tow collecting-depositing mechanism. The laser rangefinder mechanism can alarm for spindle replacement in time.

The said first tow converging unit in this invention comprises:

First guide pulley arranged on the relative face for converging tows conveyed by the tow conveying component arranged at one side of the revolving yarn box component;

Second guide pulley arranged on the relative face for converging tows guided and converged by the first guide pulley;

Third guide pulley arranged on the revolving mounting face for converging tows conveyed by the tow conveying component arranged at one side of the fixed yarn box component; and Fourth guide pulley arranged on the revolving mounting face for converging tows guided and converged by the second and third guide pulleys;

The said two first guide pulleys in this invention are arranged on the said relative face for converging tows conveyed by the tow conveying components arranged on the two sides of the revolving yarn box component on the said relative face.

Two third guide pulleys are arranged on the said revolving mounting face in this invention for converging tows conveyed by the tow conveying components arranged at the same side of the two fixed yarn box components;

The said second tow converging unit in this invention comprises:

Two fifth guide pulleys for guiding the tows that pass through the fourth guide pulley;

Tow guide combiner for converging tows that pass through two fifth guide pulleys; and placing press roll.

The guide pulley in the said tow converging mechanism in this invention is provided with guide grooves of which the number is based on the number of tows, and the said guide grooves can rotate independently. The said guide pulley refers to the guide pulleys used in the fiber placement head, for example, first guide pulley, second guide pulley, third guide pulley, fourth guide pulley and fifth guide pulley. The linear speed of single tow is accurately controlled by controlling the speed of the motor in the tow collecting-depositing mechanism, providing stable placement efficiency.

Two symmetrically placed fixed yarn box components and two symmetrically placed revolving yarn box components are respectively provided at the side ends of the said mounting base of the fiber placement head of this invention.

Two tow conveying units are arranged at each of the two sides of the said fixed yarn box component of this invention, and the two tow conveying units at the same side are in an upper-lower corresponding arrangement.

Two tow conveying units are arranged at each of the two sides of the said revolving yarn box component of this invention, and the two tow conveying units at the same side are in an upper-lower corresponding arrangement.

Comparing to the prior art, the benefits of this invention are as follows:

(1) In this invention, through appropriate design of tow converging mechanism and tow passage, the guiding and converging of multiple tows are realized, and intervening among the tows is avoided.

(2) In this invention, the number of the yarn box components can be added or expanded based on the specific requirement of the equipment, making the maximum number of tows of placement to 4N, where N is the number of the yarn box components.

(3) The guide pulley in the tow converging mechanism of this invention is provided with guide grooves of which the number is based on the number of tows, and the guide grooves can rotate independently. The linear speed of single tow is accurately controlled by controlling the speed of the motor in the tow collecting-depositing mechanism, providing stable placement efficiency.

Where, 1: Fiber placement head mounting base; 101: Revolving mounting face; 102: Fixed mounting face; 103: Upper yoke; 104: Lower yoke; 105: Revolving shaft; 106: Damping support rod; 107: Snap-joint mechanism; 107a: First through-hole; 107b: Second through-hole; 107c: Fastening pin; 2: Revolving yarn box component; 201: Revolving yarn box body; 202: Relative face; 203: Handle; 3: Fixed yarn box component; 301: Fixed yarn box body; 4: Tow conveying component; 401: Tow-collecting-depositing mechanism; 402: backing paper recycling mechanism; 403: Tension regulating mechanism; 404: Tension detection mechanism; 405: Laser rangefinder mechanism; 5: First tow converging unit; 501: First guide pulley; 502: Second guide pulley; 503: Third guide pulley; 504: Fourth guide pulley; 6: Second tow converging unit; 601: Fifth guide pulley; 602: Guide combiner; 603: Placing press roll; 7: Tow passage.

DETAILED DESCRIPTION OF THE EMBODIMENTS

Below is further detailed description of this invention in combination with specific embodiments and figures.

Figure 1:
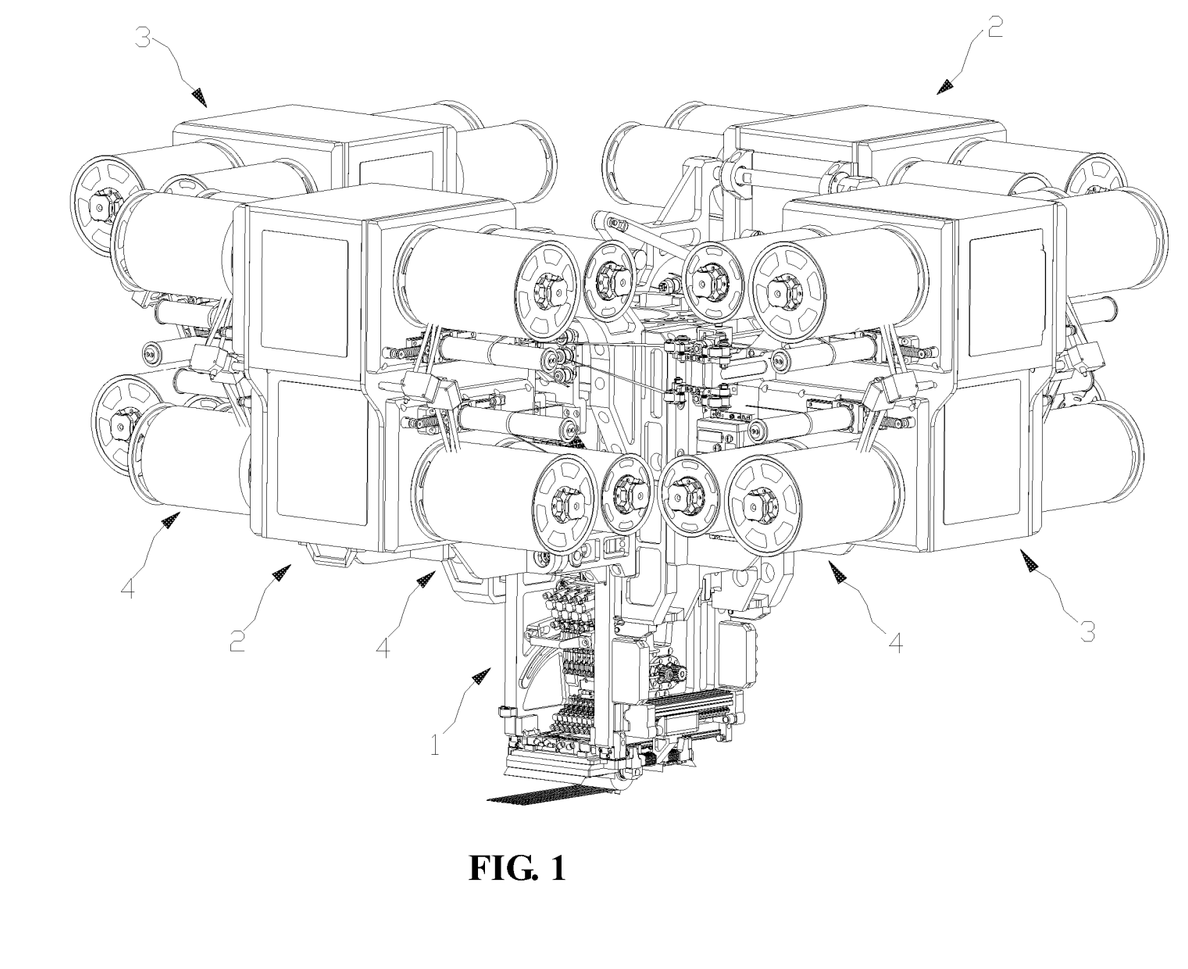
FIG. 1 is illustration of the structure of the fiber placement head in an embodiment of this invention.
Figure 2:
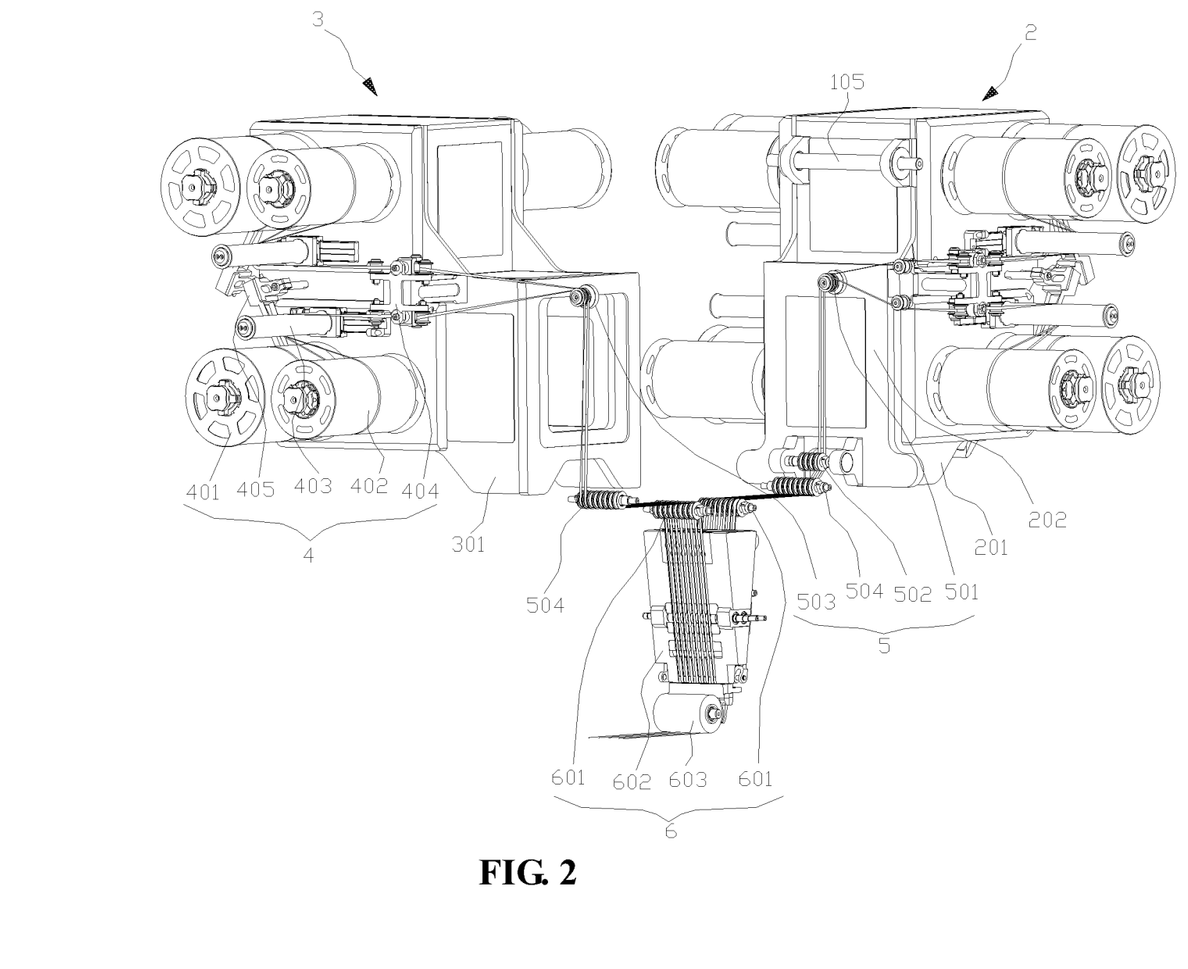
FIG. 2 is illustration of the local structures of the fixed yarn box component and revolving yarn box component in an embodiment of this invention.

As shown in FIGS. 1 and 2, the fiber placement head used for the automated placement equipment comprises: fiber placement mounting base 1, revolving yarn box component 2, fixed yarn box component 3, tow conveying component 4 and tow converging mechanism.

The whole shape of fiber placement head mounting base 1 is similar to a square column, the four sides of fiber placement head mounting base 1 are respectively two symmetrically placed fixed mounting faces 102 and two symmetrically placed revolving mounting faces 101. Fixed yarn box components 3 are respectively mounted on the two fixed mounting faces 102, while revolving yarn box components 2 are respectively mounted on the two revolving mounting faces 101.

Of course, the whole shape of fiber placement head mounting base 1 can also adopt regular hexagon column or regular octagon column, and fixed mounting face 102 and revolving mounting face 101 can also be alternately arranged on the sides of fiber placement head mounting base 1, in this way, the number of yarn box components can be added and expanded based on specific needs of the equipment, making the maximum number of tows to be placed as 4N, where N is the number of the yarn box components.

Figure 3:
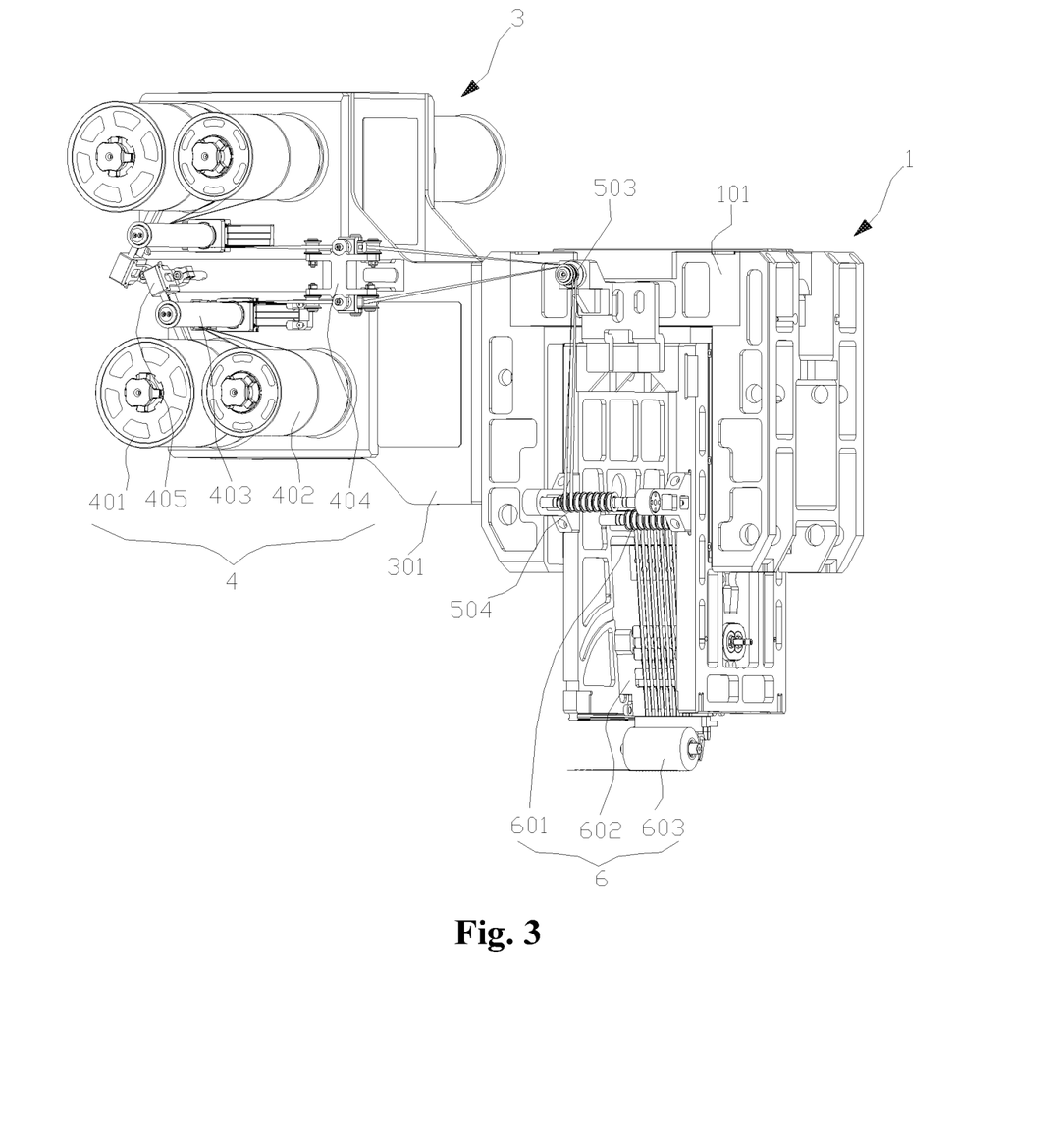
FIG. 3 is illustration of the local structures of the fixed yarn box component and the fiber placement head mounting base in an embodiment of this invention.
Figure 4:
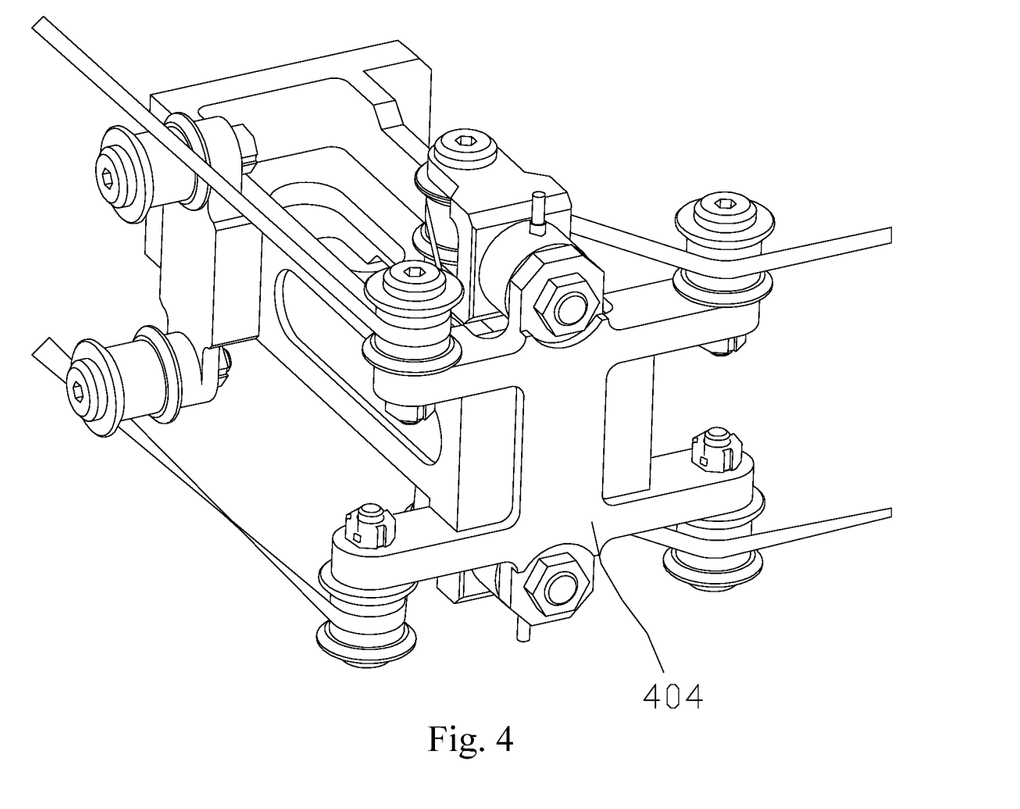
FIG. 4 is illustration of the structure of the tension detection mechanism in an embodiment of this invention.

As shown in FIG. 3, fixed yarn box component 3 comprises: fixed yarn box body 301 and tow conveying component 4 installed on fixed yarn box body 301. Fixed yarn box body 301 is fixed and mounted on fixed mounting face 102 of fiber placement head mounting base 1, fixed yarn box body 301 can comprise upper and lower layers, two tow conveying components 4 are arranged at each of the two sides of fixed yarn box body 301, the two tow conveying components 4 at the same side are arranged in an upper-lower corresponding arrangement. Each yarn box component 3 can independently complete the conveying of four routes of tows.

Wherein tow conveying component 4 comprises: tow collecting-depositing mechanism 401, backing paper recycling mechanism 402, tension detection mechanism 404, tension regulating mechanism 403 and laser rangefinder mechanism 405. The spindle is installed on the tow collecting-depositing mechanism 401, the backing paper of the tow is recycled by the backing paper recycling mechanism 402, the tow with backing paper removed goes through tension regulating mechanism 403 and tension detection mechanism 404 to be conveyed towards the tow converging mechanism. As shown in FIG. 4, tension detection mechanism 404 comprises a plurality of guide pulleys and force detection components to feedback the force information to the control system, which controls tension regulating mechanism 403 to realize stable conveying of tows under constant tension, avoiding tow breakage during the course of conveying. Laser rangefinder mechanism 405 detects the thickness of the tow left on the tow collecting-depositing mechanism 401 and provide a timely alarm for spindle replacement.

Figure 5:
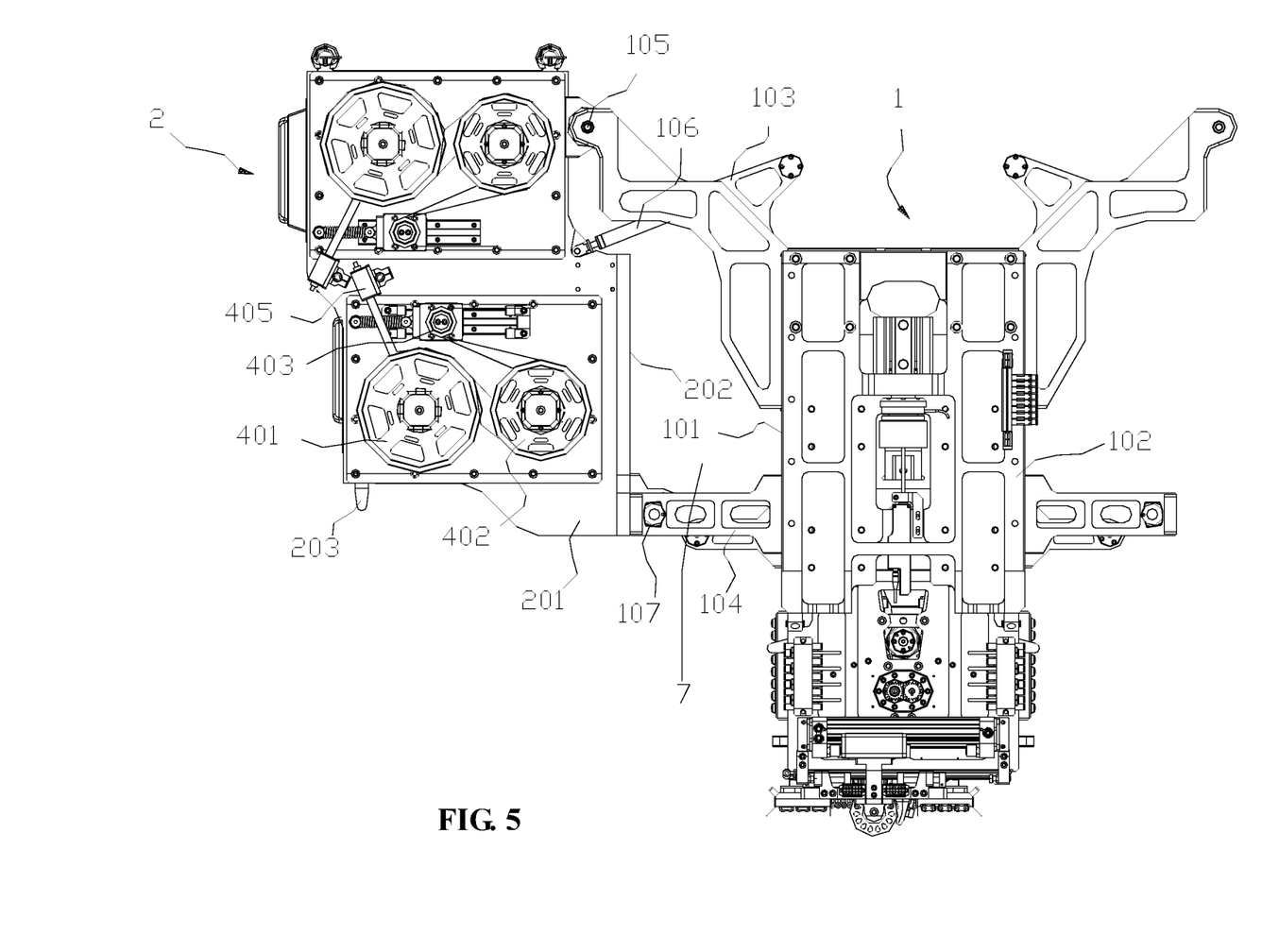
FIG. 5 is illustration of the local structure of the closed state of the revolving yarn box component in an embodiment of this invention.
Figure 6:
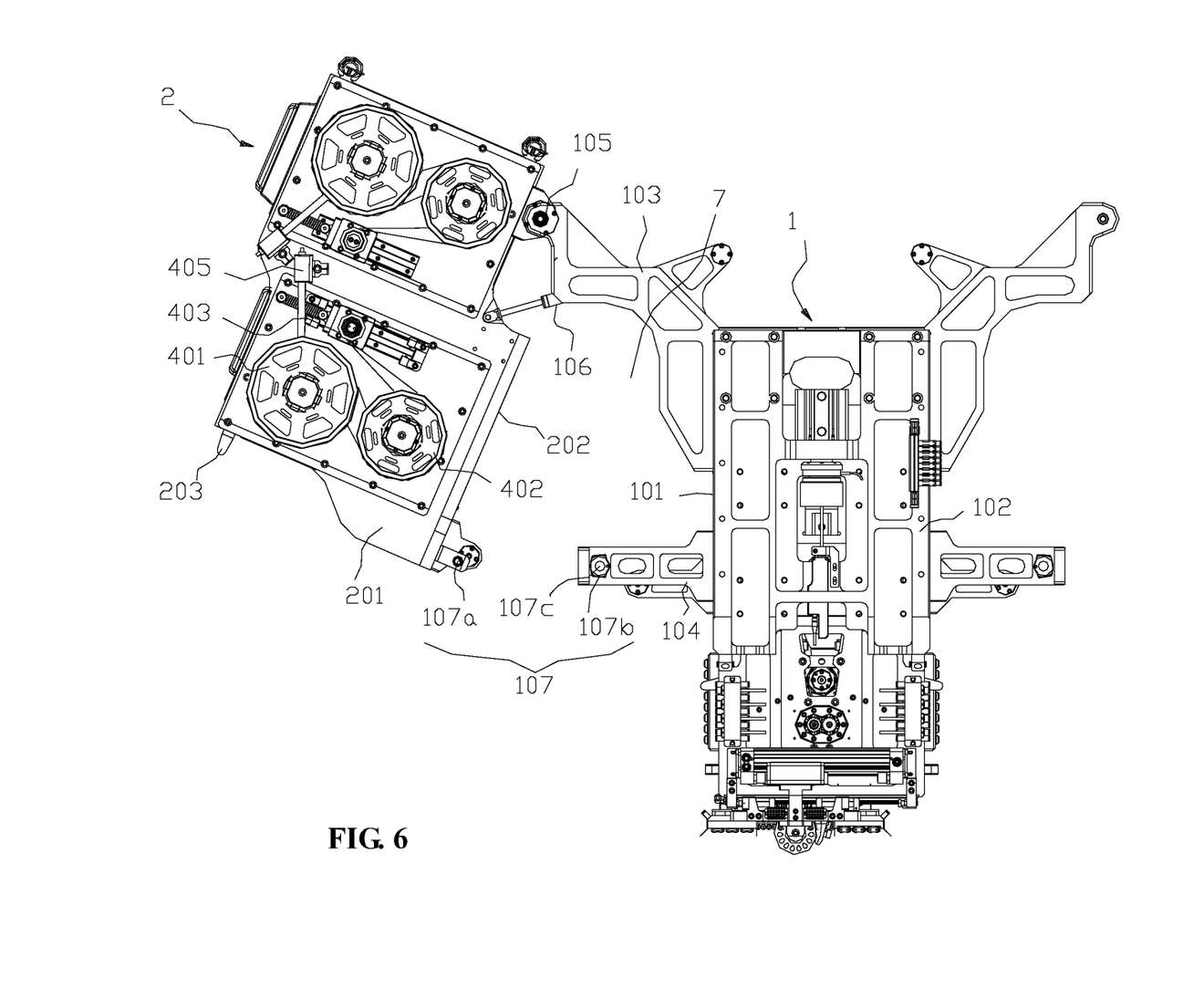
FIG. 6 is illustration of the local structure of the revolving state of the revolving yarn box component in an embodiment of this invention.

As shown in FIG. 5-6, revolving yarn box component 2 comprises: revolving yarn box body 201, tow conveying component 4 installed on revolving yarn box body 201 and handle 203. Handle 203 is arranged at the bottom of revolving yarn box body 201, revolving yarn box body 201 also comprises upper and lower layers, two tow conveying components 4 are also arranged at each of the two sides of the revolving yarn box body 201, and the two tow conveying components 4 at the same side are in an upper-lower corresponding arrangement. Each yarn box component can independently complete the conveying of four routes of tows. Since the structure and connection relationship of the tow conveying component 4 on revolving yarn box body 201 are the same as those of the tow conveying component 4 on fixed yarn box body 301, further description is not provided herein.

A pair of upper yokes 103 and a pair of lower yokes 104 are arranged on the revolving mounting face 101 of the fiber placement head mounting base 1. Upper yoke 103 is located at the side edges of the upper end of the revolving mounting face 101, lower yoke 104 is located at the side edges of the lower end of the revolving mounting face 101. Revolving shaft 105 is installed between the upper yokes 103, and revolving yarn box body 201 is coupled with fiber placement head mounting base 1 through revolving shaft 105.

In addition, a pair of damping support rod 106 is further provided between upper yoke 103 and revolving yarn box body 201. The damping support rod 106 is primarily to provide acting force on the revolving yarn box body 201, or to control the movement of the revolving yarn box body 201 in combination with other acting forces, for example, by manually pulling the handle 203 at the lower part of the revolving yarn box body 201.

Snap joint mechanism 107 is formed between lower yoke 104 and the lower contact end of revolving yarn box body 201. Snap joint mechanism 107 comprises first through-hole 107a on revolving yarn box body 201, second through-hole 107b on lower yoke 104, and fastening pin 107c. Snap joint mechanism 107 is to realize the relative fixing of the revolving yarn box body 201 and the mounting base 1 of the fiber placement head, and the snap joint mechanism 107 can adopt the structure of that in the prior art, which can open when it is exerted with force.

Tow passage 7 is formed between the revolving mounting face 101 of the fiber placement head mounting base 1 and the relative face 202 of the revolving yarn box component 2. Due to that two revolving yarn box components 2 are symmetrically arranged on the fiber placement head mounting base 1, relative faces 202 at both sides of the fiber placement head mounting base 1 are provided with tow passages 7, and since the two tow passages 7 are symmetric, therefore, FIG. 5-6 show one of them only.

As shown in FIG. 2-3, the tow converging mechanism comprises first tow converging unit 5 arranged in tow passage 7 and second tow converging unit 6 arranged at the lower part of fiber placement head mounting base 1. The first tow converging unit 5 is for guiding and converging tows conveyed by tow conveying component 4, the second tow converging unit 6 is for guiding and converging tows converged by first tow converging unit 5.

Where, first tow converging unit 5 comprises: first guide pulley 501, second guide pulley 502, third guide pulley 503 and fourth guide pulley 504. Two first guide pulleys 501 are arranged on the relative face 202 of one revolving yarn box component 2 respectively for converging tows conveyed by the tow conveying components arranged on the two sides of the revolving yarn box component 2. FIG. 2 shows only the first guide pulley 501 at the right side, however, each of the two revolving yarn box components 2 have two first guide pulleys 501, and there are actually four first guide pulleys 501 in total. Since they are in symmetric arrangement, the figure shows the first guide pulley 501 at the right side only. First guide pulley 501 has two guide grooves, which can rotate independently, and one first guide pulley 501 can realize the guiding and converging of two pieces of tows.

Second guide pulley 502 is arranged at the lower part of the relative side 202 of the revolving yarn box component 2. FIG. 2 shows only one second guide pulley 502, however, each of the two revolving yarn box components 2 have one second guide pulley 502, and there are actually two second guide pulleys 502 in total. Second guide pulley 502 has four guide grooves, which can rotate independently for converging tows guided and converged after going through the two corresponding first guide pulleys 501. One second guide pulley 502 can realize guiding and converging of four pieces of tows on one revolving yarn box component 2.

Whereas third guide pulley 503 is arranged at the upper part of the revolving mounting face 101 of the fiber placement head mounting base 1, two third guide pulleys 503 are also arranged on one revolving mounting face 101, and totally four third guide pulleys 503 are provided on two corresponding revolving mounting faces 101. Since they are in symmetric arrangement, FIG. 3 shows only one of them. One third guide pulley 503 has two guide grooves, which can rotate independently. Third guide pulley 503 is for converging two pieces of tows conveyed by the tow conveying component 4 on one side of the fixed yarn box component 3 on the corresponding side. For example, the third guide pulley 503 at the right side in FIG. 3 is for converging two pieces of tows conveyed by the tow conveying component 4 on the corresponding side of the left side fixed yarn box component 3.

Fourth guide pulley 504 is arranged at the middle part of the revolving mounting face 101 of the fiber placement head mounting base 1. FIG. 3 shows only one fourth guide pulley 504, however, two symmetrically arranged fourth guide pulleys 504 are actually provided on the two corresponding revolving mounting faces 101 in total. Since they are in symmetric arrangement, FIG. 3 shows only one of them. One fourth guide pulley 504 has eight guide grooves, which can rotate independently for converging eight pieces of tows guided and converged by going through one second guide pulleys 502 and two third guide pulleys 503 in the same tow passage 7. The fiber placement head is divided into two halves by the center line of the two fixed yarn box components 3, which are respectively guided and converged by the fourth guide pulleys in the corresponding tow passage 7. The whole structure is symmetrical.

Second tow converging unit 6 comprises: two fifth guide pulley 601, guide combiner 602 and placing press roll 603. Two fifth guide pulleys 601 are arranged at the two sides of the lower part of the fiber placement head mounting base and are in parallel arrangement with the fourth guide pulleys at the same side for guiding the tows conveyed by the fourth guide pulleys 504 at the same side. Fifth guide pulley 601 has eight guide grooves, which can rotate independently. Guide combiner 602 is for pressing, cutting and re-conveying tows, wherein the guide combiner 602 is a V-shaped structure as a whole. Eight pieces of tows are arranged at each of the two sides, totally sixteen pieces of tows are converged at the bottom, and the fiber tows are placed through the placing press roll 603.

What is claimed is:

1. A fiber placement head integrating tow convergence mechanism, comprising:
    a fiber placement head mounting base;
    at least one fixed yarn box component and at least one revolving yarn box component arranged at sides of the fiber placement head mounting base, wherein a tow passage is formed between a revolving mounting face of the fiber placement head mounting base and a relative face of the revolving yarn box component;
    first tow conveying components, respectively arranged at opposite sides of the fixed yarn box component;
    second tow conveying components, respectively arranged at opposite sides of the revolving yarn box component, wherein the relative face is located between the opposite sides of the revolving yarn box component; and
    a tow converging mechanism for guiding and converging tows conveyed by the first tow conveying components and the second tow conveying components;
    wherein the tow converging mechanism comprises a first tow converging unit arranged in the tow passage and a second tow converging unit arranged at a lower part of the fiber placement head mounting base; the first tow converging unit is for guiding and converging the tows conveyed by the first tow conveying components and the second tow conveying components, the second tow converging unit is for guiding and converging tows converged by the first tow converging unit,
    wherein the first tow converging unit comprises:
        a first guide pulley arranged on the relative face for converging tows conveyed by one of the second tow conveying components arranged at one side of the revolving yarn box component;
        a second guide pulley arranged on the relative face for converging tows guided and converged by the first guide pulley;
        a third guide pulley arranged on the revolving mounting face for converging tows conveyed by one of the first tow conveying components arranged at one side of the fixed yarn box component; and
        a fourth guide pulley arranged on the revolving mounting face for converging tows guided and converged by the second and third guide pulleys.

2. The fiber placement head integrating tow converging mechanism according to claim 1, wherein each of the first tow conveying components and each of the second tow conveying components, respectively, comprises: a tow collecting-depositing mechanism, a backing paper recycling mechanism, a tension regulating mechanism and a tension detection mechanism sequentially arranged in a tow conveying direction.

3. The fiber placement head integrating tow converging mechanism according to claim 2, wherein each of the first tow conveying components and each of the second tow conveying components, respectively, further comprises: a laser rangefinder mechanism for detecting a thickness of tows left on the tow collecting-depositing mechanism.

4. The fiber placement head integrating tow converging mechanism according to claim 1, wherein two first guide pulleys are arranged on the relative face for respectively converging tows conveyed by the second tow conveying components arranged on the opposite sides of the revolving yarn box component.

5. The fiber placement head integrating tow converging mechanism according to claim 1, wherein two third guide pulleys are arranged on the revolving mounting face for respectively converging tows conveyed by one of the first tow conveying components arranged on a same side of the fixed yarn box component.

6. The fiber placement head integrating tow converging mechanism according to claim 1, wherein the second tow converging unit comprises:
    two fifth guide pulleys for guiding the tows that pass through the fourth guide pulley;
    a tow guide combiner for converging tows that pass through the two fifth guide pulleys; and
    a placing press roll.

7. The fiber placement head integrating tow converging mechanism according to claim 1, wherein each of the first guide pulley, the second guide pulley, the third guide pulley and the fourth guide pulley in the tow converging mechanism is provided with guide grooves having a number based on the number of tows, and the guide grooves can rotate independently.

8. The fiber placement head integrating tow converging mechanism according to claim 1, wherein two symmetrically placed fixed yarn box components and two symmetrically placed revolving yarn box components are respectively provided at the sides of the fiber placement head mounting base.

9. The fiber placement head integrating tow converging mechanism according to claim 1, wherein two first tow conveying components are arranged at each of the opposite sides of the fixed yarn box component, and the two first tow conveying components at a same side of the fixed yarn box component are in an upper-lower corresponding arrangement; two second tow conveying components are arranged at each of the opposite sides of the revolving yarn box component, and the two second tow conveying components at a same side of the revolving yarn box component are in an upper-lower corresponding arrangement.

* * * * *